United States Patent [19]
Harcourt et al.

[11] Patent Number: 5,683,586
[45] Date of Patent: Nov. 4, 1997

[54] METHOD AND APPARATUS FOR MAGNETICALLY TREATING A FLUID

[76] Inventors: Gregory A. Harcourt, RR#1, Northbrook, Ontario, Canada, K0H 2G0; David L. Harcourt, RR#1, Cloyne, Ontario, Canada, K0H 1K0

[21] Appl. No.: 596,554

[22] Filed: Feb. 5, 1996

[51] Int. Cl.⁶ .................................. B01D 35/06
[52] U.S. Cl. ............... 210/695; 210/222; 210/223
[58] Field of Search ................. 210/222, 223, 210/695; 204/149, 155, 650

[56] References Cited

U.S. PATENT DOCUMENTS

| | | | |
|---|---|---|---|
| 2,652,925 | 9/1953 | Vermelran . | |
| 2,939,830 | 6/1960 | Green | 204/248 |
| 3,228,878 | 1/1966 | Moody | 210/57 |
| 3,947,533 | 3/1976 | Davis | 264/24 |
| 4,146,479 | 3/1979 | Brown | 210/22 |
| 4,153,559 | 5/1979 | Sanderson | 210/22 |
| 4,210,535 | 7/1980 | Risk | 210/222 |
| 4,229,701 | 10/1980 | Garrett et al. | 210/222 |
| 4,326,954 | 4/1982 | Shroyer | 210/222 |
| 4,407,719 | 10/1983 | Van Gorp | 210/695 |
| 4,543,186 | 9/1985 | Weisenbarger | 210/221.2 |
| 4,605,498 | 8/1986 | Kulish | 210/222 |
| 4,711,271 | 12/1987 | Weisenbarger | 137/287 |
| 4,938,875 | 7/1990 | Niessen | 210/695 |
| 5,074,998 | 12/1991 | Doelman | 210/97 |
| 5,171,431 | 12/1992 | Schulte | 210/94 |
| 5,204,628 | 4/1993 | Konishi | 324/316 |
| 5,329,911 | 7/1994 | Jeong | 123/538 |
| 5,356,534 | 10/1994 | Zimmerman | 210/222 |
| 5,366,623 | 11/1994 | Clair | 210/222 |
| 5,378,362 | 1/1995 | Schoepe | 210/222 |
| 5,380,430 | 1/1995 | Overton | 210/222 |
| 5,411,143 | 5/1995 | Greene | 210/222 |

FOREIGN PATENT DOCUMENTS

| | | |
|---|---|---|
| 2063605 | 9/1971 | France . |
| 2738649 | 3/1979 | Germany . |
| 7013995 | 7/1964 | Japan . |
| J6 2244-487A | 4/1986 | Japan . |
| 360976 | 9/1970 | U.S.S.R. . |
| 523700 | 2/1974 | U.S.S.R. . |
| 1031464 | 7/1983 | U.S.S.R. . |
| 1031908 | 7/1983 | U.S.S.R. . |
| 1189888 | 4/1970 | United Kingdom . |

OTHER PUBLICATIONS

Magnetic Fluid Conditioning, Magnetizer Group Brochure, 1988.

*Primary Examiner*—David A. Reifsnyder
*Attorney, Agent, or Firm*—Richard J. Hicks

[57] ABSTRACT

A method and apparatus for magnetically treating liquids and gases, is described. The fluid is passed along a pipeline having a permanent magnet aligned therewith, and a coil, rounded at each end, is wrapped around both the pipe and the magnet. Magnetic flux is enhanced by providing a diode in each turn of the coil surrounding the magnet and pipe. Optionally, a collector plate may be provided in the coil remote from the pipe.

7 Claims, 1 Drawing Sheet

METHOD AND APPARATUS FOR MAGNETICALLY TREATING A FLUID

FIELD OF INVENTION

This invention relates to a method and apparatus for the magnetic treatment of fluids, and particularly liquids, so as to alter the atomic characteristics thereof and derive economic benefits therefrom.

BACKGROUND OF INVENTION

Magnetic fluid conditioning, sometimes referred to as Magneto Hydro Dynamics (MHD), is well known in the art and has been studied extensively throughout the world, and in particular in the former U.S.S.R., as a way to prevent, loosen or remove scale or crust from water pipes, boilers, heat exchangers and the like. MHD has also been suggested as a way to improve fuel efficiency of internal combustion engines, to improve efficiency of refrigeration systems, improve water softening systems and reduce detergent requirements in laundry operations, and even to reduce biological encrustations or tissue growth in water pipes. The latter application may be particularly significant as a method to control zebra mussel infestations.

Numerous magnetic devices have been developed and attention is directed to U.S. Pat. Nos. 2,652,535; 3,228,878; 4,146,479; 4,153,569; and 4,210,535 among others which describe in detail many variations of a basic device which applies a magnetic field to water or other fluid flowing through a pipe or other conduit. All of these devices have met with varying degrees of success and there can be no doubt that MHD is an extremely efficient, low cost technology for "conditioning" many types of fluids. Despite its obvious utility, MHD has not enjoyed wide popularity, particularly in North America. It is believed that this may be due to shortcomings in early types of equipment. For example, it is now known that the early magnets used were simply not strong enough. It is now known that the quality of conditioning is directly proportional to the flux density (power) and length of the magnetic field. Furthermore, magnetic effects on fluid dynamics is an area of science which is not clearly or widely understood and equipment design has suffered accordingly.

There is a need, therefore, for an improved MHD apparatus which can be used to treat water, improve fuel efficiency, improve refrigeration efficiency, treat sewage more efficiently, and prevent biological tissues building up on water intakes and the like.

OBJECT OF INVENTION

An object of the present invention is to provide an improved apparatus for magnetically treating fluids.

BRIEF DESCRIPTION OF INVENTION

By one aspect of the present invention there is provided a method for treating a fluid flowing along a fluid flow path, comprising: providing permanent magnetic means adjacent said fluid flow path; providing a coil having a plurality of contiguous, non-overlapping turns around said fluid flow path and said permanent magnet, providing a diode in each of said contiguous turns, in series relationship with each other, and connecting each end of said coil to ground.

By another aspect of the invention there is provided an apparatus for magnetically treating a fluid flowing in a fluid flow path, comprising: permanent magnet means adapted for placement adjacent said fluid flow path; coil means having a plurality of contiguous non-overlapping turns axially enclosing said fluid flow path and said magnet means; diode means in each said turn of said coil means, in series relationship to each other; and means to ground each end of said coil means.

DETAILED DESCRIPTION OF PREFERRED EMBODIMENTS

Figure 1:
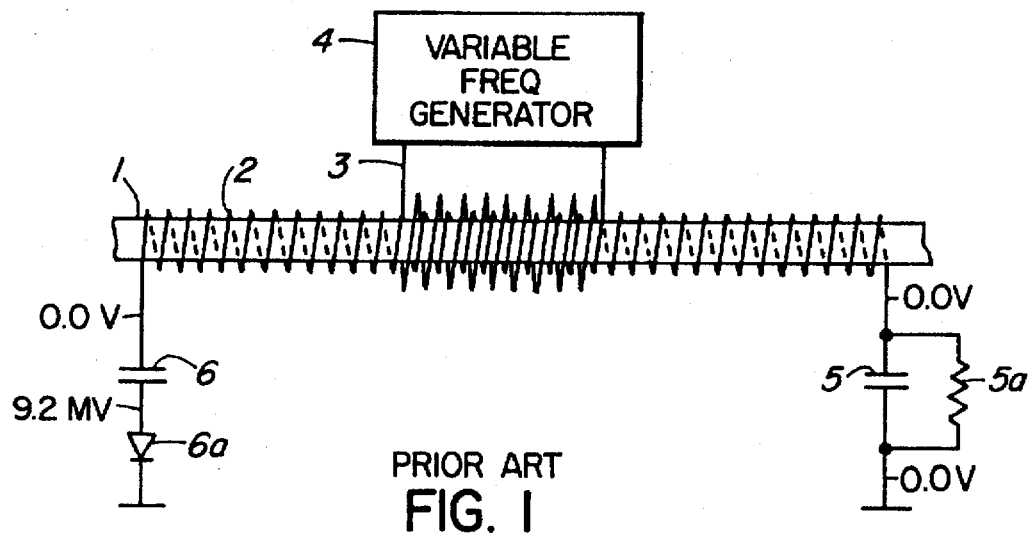
FIG. 1 is a sketch of an apparatus according to the prior art.
Figure 2:
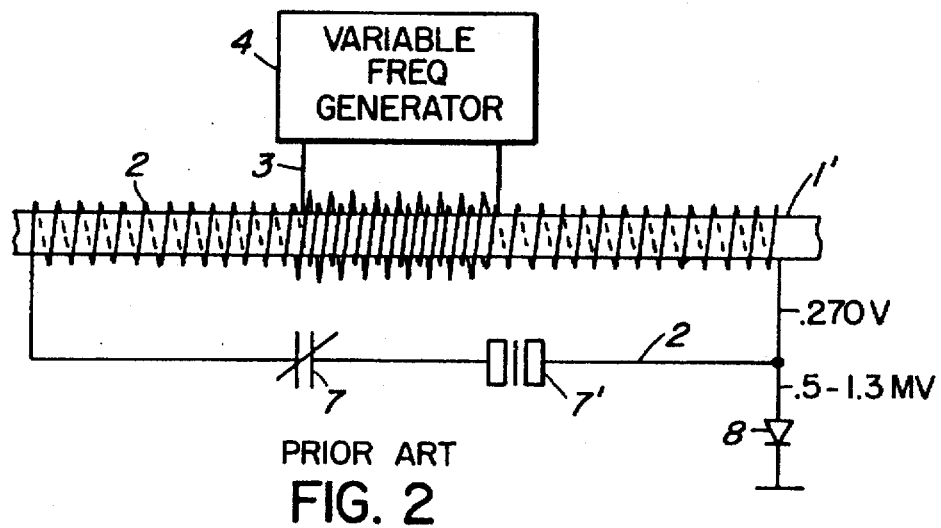
FIG. 2 is a sketch of an alternative embodiment of the apparatus of FIG. 1.

Attention is firstly directed to FIGS. 1 and 2 which represent an apparatus as described in U.S. Pat. No. 4,938,875 issued Jul. 3, 1990 to Niessen, the disclosure of which is hereby incorporated herein by reference. A conductive pipe 1 is designed to carry a fluid to be treated. Around pipe 1 is wound an electrically conductive cable 2 in a series of non-overlapping contiguous turns. This is termed a secondary circuit. Over winding 2, in the same direction and with contiguous turns, there is provided another flexible, insulated electrically conductive cable 3. This is termed a primary circuit, and the ends of cable 3 are connected to a generator 4 which is an electric pulse generator. Connected to one end of the secondary circuit 2 is the plate of a fixed or variable capacitor 5, the other plate being connected to ground. A fixed or variable resistor 5a is connected in parallel to complete the turning system. To the other end of cable 2, another fixed or variable capacitor 6 may be connected by one of the plates. This capacitor 6 is optional as is the interposition of a diode 6a intended for polarization. The second plate of capacitor 6, or the diode is then grounded.

In the embodiment shown in FIG. 2, pipe 1' is non conductive, in which case the ends of secondary winding 2 can be connected together. The interposition of a capacitor 7 is optional as is resistor 7' or a quartz turning element. There is an optional ground connection, with or without a diode 8.

Figure 3:
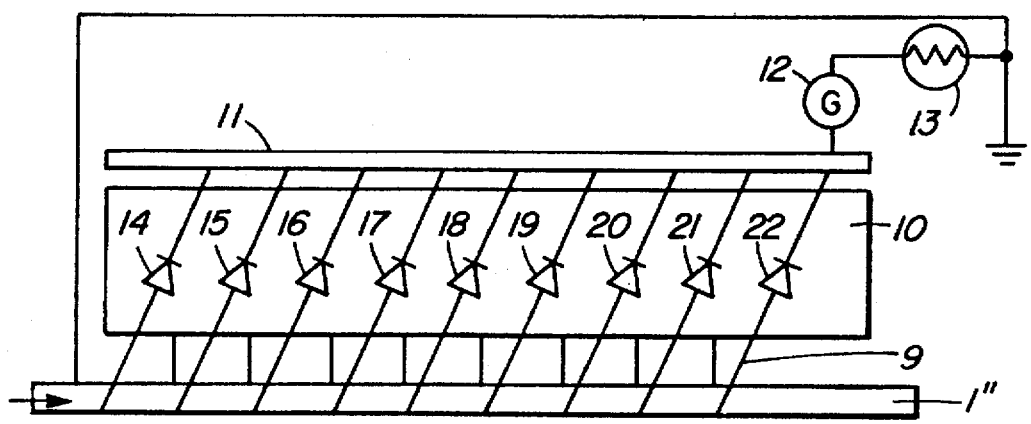
FIG. 3 is a sketch of one embodiment of an apparatus according to the present invention.

FIG. 3 shows an arrangement according to the present invention. A conductive or non-conductive pipe 1", to carry a fluid to be treated is provided with a series of non-overlapping contiguous turns of a conductive cable 9, which turns also surround a permanent magnet 10, and an optional backup or collector ferrous plate 11. It will be appreciated that while a single magnet is shown, amore uniform field can be achieved if a plurality of magnets are spaced around the pipe. It is immaterial whether the cable 9 is wound clockwise or counter clockwise. One end of cable 9 is connected to ground directly, while the other end of cable 9 is either directly grounded or grounded through an optional current generator 12 and resistor 13. In contrast to the prior art which provides optional diodes 6a and/or 8, the present invention provides a diode 14–21 respectively in each turn of cable 9. As noted hereinabove, the quality of conditioning of a fluid whether it is a liquid or a gas is directly proportional to the flux density or power of the magnetic field applied. Accordingly, voltage readings to ground were taken at each of diodes 14–21 in the arrangement according to FIG. 3, using water, at a rate of 3 imperial gallons/minute at a pressure of 40 psig, as the flowing medium in the pipe 1" which has an ID of one inch and using a permanent magnet of 3.4 MG.Oe (Grade 5 Ceramic Magnet No 113, 1"×1"×3", by Jobmaster Magnets Canada Inc). Diodes 14–21 were 6v, 6a, 1 ohm diodes from a local supplier.

| The readings were: | |
|---|---|
| 14 | 8 mv |
| 15 | 15 mv |
| 16 | 18 mv |
| 17 | 22 mv |
| 18 | 25 mv |
| 19 | 28 mv |
| 20 | 36 mv |
| 21 | 44 mv |
| 22 | 54 mv |

Similar measurements were made with the arrangements of FIGS. 1 and 2 and values ranging from zero to 9.2 mv were recorded in the arrangement of FIG. 1 and from 0.5 to 27 mv were recorded in the arrangement of FIG. 2 at the points indicated therein. It is apparent that the plurality of diodes of the present invention results in a far greater flux density being applied to the flowing fluid in the pipe. Decreased useage of detergent in laundry use of water treated in the apparatus of FIG. 3 was noted and the process may also be applied to softening water by reducing the total hardness, to descaling pipes, decreasing algae and biological encrustations (i.e. zebra mussels) in pipes, improving combustion properties of gases in furnace applications, including treating combustion air, improving fuel efficiency in internal combustion engines (gasoline and diesel) and improving efficiency of refrigeration systems.

We claim:

1. A method for treating a fluid flowing along a fluid flow path, comprising: providing permanent magnetic means adjacent said fluid flow path, providing a coil having a plurality of contiguous, non-overlapping turns around said fluid flow path and said permanent magnet, providing a diode in each of said contiguous turns, in series relationship with each other, and connecting each end of said coil to ground.

2. A method as claimed in claim 1 including providing a collector plate within said coil remote from said fluid flow path.

3. A method as claimed in claim 1 wherein said fluid is water and softening thereof is effected by magnetic flux generated by said magnet.

4. An apparatus for magnetically treating a fluid flowing in a fluid flow path, comprising: permanent magnet means adapted for placement adjacent said fluid flow path; coil means having a plurality of contiguous non-overlapping turns axially enclosing said fluid flow path and said magnet means; diode means in each said turn of said coil means, in series relationship to each other; and means to ground each end of said coil means.

5. An apparatus as claimed in claim 4 including collector plate means for mounting in substantially parallel relationship to said magnet means and said fluid flow path within said coil means but remote from said fluid flow path.

6. An apparatus as claimed in claim 5 wherein said fluid flow path comprises a pipe.

7. An apparatus as claimed in claim 6 wherein said fluid is selected from the group consisting of water, air, hydrocarbon liquid, hydrocarbon gas, and refrigerant gases.

* * * * *